US008936426B2

(12) United States Patent
Peterson

(10) Patent No.: US 8,936,426 B2
(45) Date of Patent: Jan. 20, 2015

(54) SUSPENDED DUMPING SYSTEM

(75) Inventor: Robert L. Peterson, Beaverton, OR (US)

(73) Assignee: Allied Power Products, Inc., Beaverton, OR (US)

( * ) Notice: Subject to any disclaimer, the term of this patent is extended or adjusted under 35 U.S.C. 154(b) by 952 days.

(21) Appl. No.: 13/085,988

(22) Filed: Apr. 13, 2011

(65) Prior Publication Data

US 2012/0261372 A1 Oct. 18, 2012

(51) Int. Cl.

*B65G 65/04* (2006.01)
*E04G 21/02* (2006.01)
*B66C 3/06* (2006.01)

(52) U.S. Cl.

CPC ................ *E04G 21/025* (2013.01); *B66C 3/06* (2013.01)
USPC .......................................................... 414/423

(58) Field of Classification Search

CPC B66C 13/00; B66C 2700/017; A21C 1/1445; B66F 9/16; B66F 9/06; B66F 9/02; B65G 65/00; B65G 65/23
USPC .......... 414/243, 639, 640, 420, 422; 254/391, 254/393–398
See application file for complete search history.

(56) References Cited

U.S. PATENT DOCUMENTS

| | | | | |
|---|---|---|---|---|
| 226,557 A | | 4/1880 | Seward | |
| 376,242 A | | 1/1888 | Goetz | |
| 866,628 A | | 9/1907 | Crowson | |
| 1,062,208 A | | 5/1913 | Williams | |
| 1,258,833 A | | 3/1918 | Venable | |
| 1,301,626 A | | 4/1919 | Watters | |
| 1,377,744 A | * | 5/1921 | Baker | 414/650 |
| 1,514,000 A | | 11/1924 | Kjode | |
| 1,717,549 A | | 6/1929 | Brosius | |
| 1,869,989 A | | 8/1932 | Venable | |
| 1,993,800 A | * | 3/1935 | Plant | 414/640 |
| 2,134,991 A | * | 11/1938 | Whitmire | 414/716 |
| 2,141,702 A | * | 12/1938 | Walsh | 294/68.26 |
| 2,443,537 A | * | 6/1948 | Hilgeman | 414/691 |
| 2,629,190 A | * | 2/1953 | Berner | 37/396 |

(Continued)

OTHER PUBLICATIONS

Gar-Bro Manufacturing Co., Concrete Placing Equipment, printed from www.garbro.com/concrete.htm on May 29, 2011, 5 pages, at least as early as 2009.

(Continued)

*Primary Examiner* — Saul Rodriguez
*Assistant Examiner* — Emery Hassan
(74) *Attorney, Agent, or Firm* — Chernoff Vilhauer McClung & Stenzel, LLP

(57) ABSTRACT

A material dumping system is suspendable by a single hoist line. A first hoist line pulley is attached to a forward attachment element on a dumping container so that the line can be wrapped under the first pulley to support the container. The hoist line extends from under the first pulley to a second pulley attachable to the hoist's support structure where it is wrapped over the second pulley to extend therefrom to a rearward attachment element on the dumping container. A selectively actuated hoist line brake permits rotation of both pulleys during normal raising and lowering of the dumping container with the container in a horizontal attitude. However, when it is desired to dump the contents of the container, the hoist line brake is actuated to prevent rotation of the second pulley while permitting rotation of the first pulley. The hoist line is then extended to tilt the container forward for dumping purposes.

18 Claims, 2 Drawing Sheets

(56) References Cited

U.S. PATENT DOCUMENTS

| | | | | |
|---|---|---|---|---|
| 3,036,393 | A | 5/1962 | Baird, Jr. | |
| 3,102,752 | A | 9/1963 | Jenkins | |
| 3,424,440 | A * | 1/1969 | Louis et al. | 366/47 |
| 3,934,917 | A | 1/1976 | Paxton et al. | |
| 4,328,987 | A | 5/1982 | Zoudlik | |
| 4,351,417 | A | 9/1982 | Seiz et al. | |
| 5,404,978 | A | 4/1995 | Hagiwara | |
| 5,419,417 | A | 5/1995 | Madsack | |
| 5,649,729 | A | 7/1997 | Peterson | |
| 5,752,334 | A | 5/1998 | Immel | |
| 6,826,466 | B2 | 11/2004 | Rowlands et al. | |
| 2003/0024137 | A1 * | 2/2003 | Briscoe et al. | 37/398 |
| 2003/0198548 | A1 * | 10/2003 | Stewart | 414/425 |
| 2013/0195593 | A1 * | 8/2013 | Knuth | 414/697 |

OTHER PUBLICATIONS

Hippo Hopper Self-Dumping Hoppers, Crane Hoppers, printed from www.hippohopper.com/subcategory/tabid/55/Default.aspx?SubcategoryUID=5a9d0 on May 29, 2011, 2 pages, at least as early as 2009.

Solution Dynamics Inc., Hoist Hopper, printed from www.self-dumping-hoppers.com/index.php?main_page=product_info&cPath=19&p on May 29, 2011, 1 page, at least as early as 2009.

* cited by examiner

FIG. 2
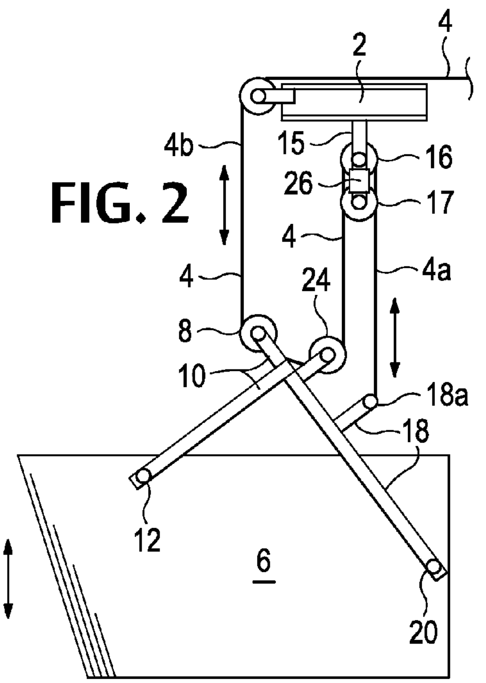
FIG. 1
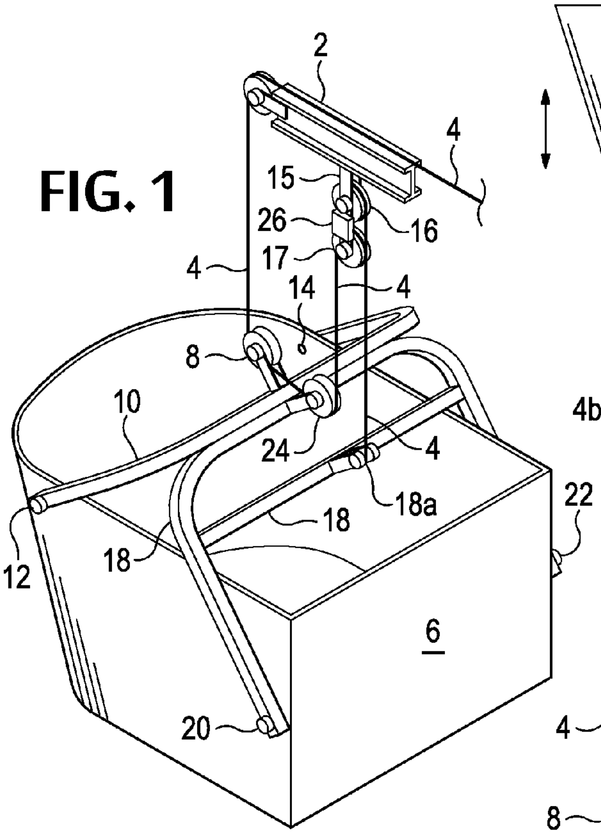
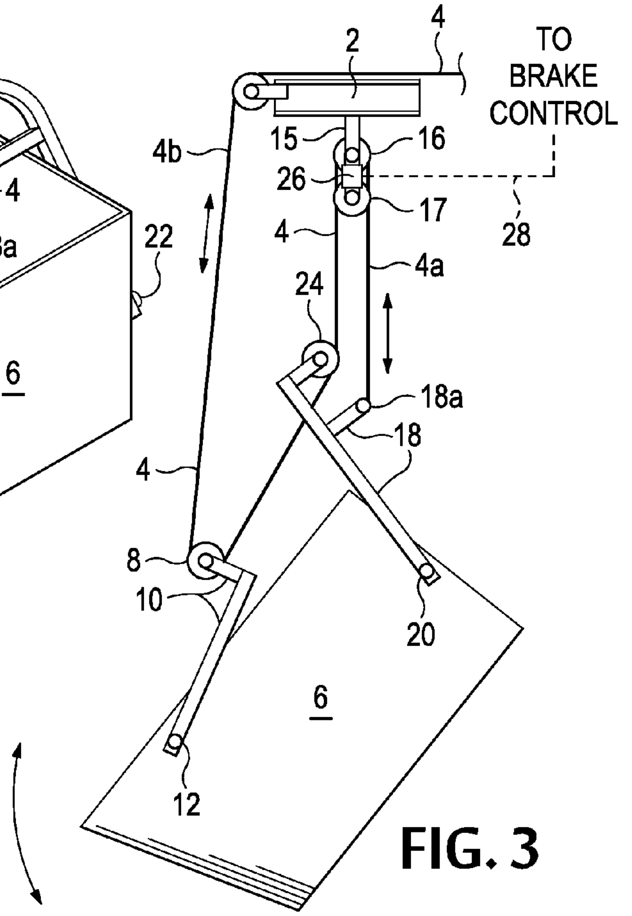
FIG. 3

SUSPENDED DUMPING SYSTEM

BACKGROUND OF THE INVENTION

This disclosure relates generally to cable-suspended, tiltable dumping containers, such as hoppers and buckets, for a wide variety of liquid, semi-liquid and dry bulk materials used for industrial purposes.

More particularly, such a dumping container is movably suspended by a flexible, selectively retractable and extensible cable or other type of line from a support, such as a hoist boom, for selectively raising and lowering the container and its contents and then tilting the container to dump its contents in a particular place.

It is desirable that the tilting of the container be controllable remotely, without the need for an attendant at the dumping location to control the tilting action, nor the need for any additional line to the container, or any powered actuator on the container, to control the tilting action.

BRIEF DESCRIPTION OF THE SEVERAL VIEWS OF THE DRAWINGS

FIG. 1 is a perspective view of an exemplary embodiment of a dumping system in accordance with the present invention.

FIG. 2 is a side view of the dumping system of FIG. 1, showing the dumping container in a horizontal, material-carrying position.

FIG. 3 is a side view showing the dumping container of FIG. 2 in a tilted material-dumping position.

DETAILED DESCRIPTION OF PREFERRED EMBODIMENTS

Figure 4:
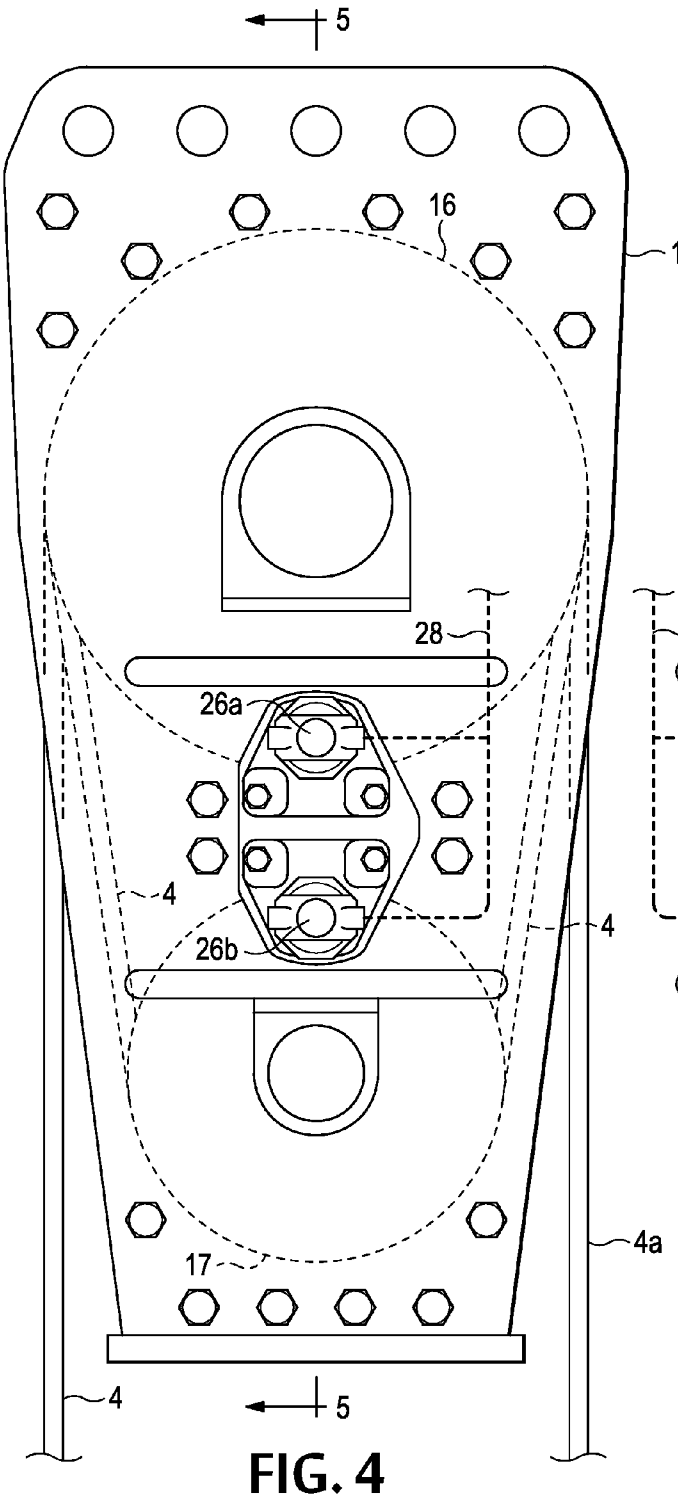
FIG. 4 is a detail side view of an exemplary type of remotely-actuated line brake which can be used in the embodiment of FIGS. 1-3.

An exemplary embodiment of the dumping system is shown in FIGS. 1-5. In this embodiment, the dumping container is particularly useful for carrying and dumping fluid concrete or aggregate. Other types of containers can be used depending upon the type of materials to be handled.

In the exemplary figures a support, such as an exemplary hoist boom 2, extends from a crane or other type of industrial equipment (not shown) to provide a support for suspending the dumping system by means of a single selectively extensible and retractable cable-type hoist line 4 which vertically supports the dumping container 6. A first pulley 8 is attached by a first attachment element 10 to the container 6 so that the line 4 can be wrapped under the pulley 8. The attachment element 10 preferably is in the shape of a bail which is pivotally attached to the container 6 at two opposed pivot points 12 and 14. The line 4 proceeds from under the pulley 8 to a second pulley 16 attachable by a clevis-type hanger 15 to the support 2 so that the line is wrapped over the pulley 16.

Figure 5:
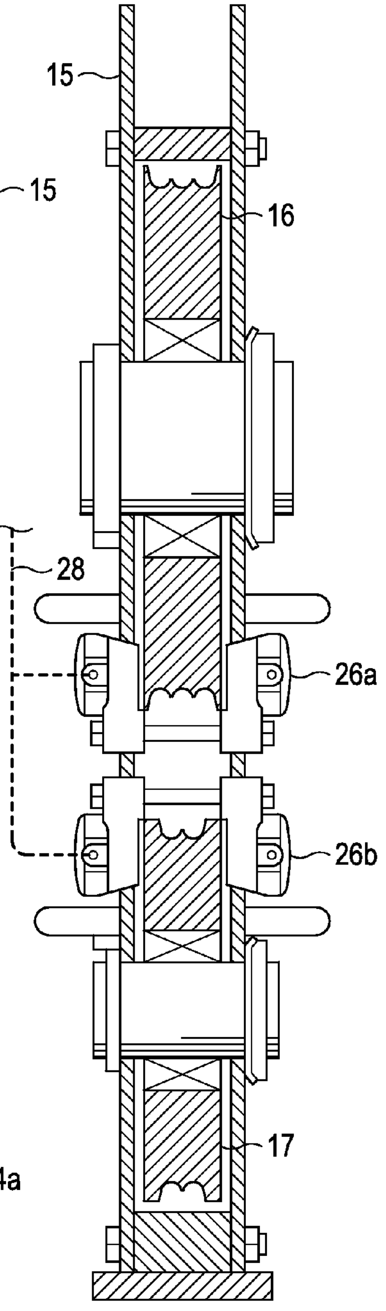
FIG. 5 is a partial cross-section view of the brake, taken along line 5-5 of FIG. 4.

Associated with the second pulley 16 is a selectively actuated line brake 26 which may take different hydraulic, pneumatic, or electrical forms, and which is controlled remotely through a conduit 28 (FIG. 3) of a fluid power or electrical type, as the case may be. In FIGS. 4-5, the exemplary line brake 26 is in the form of a hydraulic caliper pulley-clamping brake having caliper portions 26*a* and 26*b* selectively actuated by hydraulic pressure in conduit 28. The caliper portion 26*a* can selectively clamp the pulley 16 while the caliper portion 26*b* simultaneously clamps a lower pulley 17, under which the line 4 is wrapped and then further wrapped in multiple turns over and under the pulleys 16 and 17. The line 4 extends downwardly from the pulley 16 to a second attachment element 18, likewise preferably shaped as a bail extending between two opposed pivot points 20 and 22 on the container 6.

Preferably the second attachment element 18 contains a guide pulley 24 under which the line 4 is wrapped on its way from the first pulley 8 to the second pulley 16 for purposes to be explained hereafter. It should be understood that the pulley 24, and the pivotal bail-shaped first and second attachment elements 10 and 18, represent merely preferred embodiments, and may be replaced by other forms of these features in other embodiments of the invention. For example, the first and second attachment elements 10 and 18 may alternatively not be bail-shaped, or one or both of them may be fixedly attached to the container or movably attached slidably or in some other non-pivotal fashion.

When it is desired merely to raise or lower the load, the caliper portions 26*a* and 26*b* of the brake 26 are not actuated and the pulleys 16 and 17, over which line 4 is wrapped in multiple turns, turn freely. Therefore, during normal raising or lowering of the container 6 to position it for dumping, the line 4 can be retracted or extended, as the case may be, while the line 4 moves around freely rotating pulleys 8, 24, 16 and 17 of the system to move the container 6 upward or downward in a level attitude as depicted in FIG. 2.

When the container 6 is properly positioned for dumping, the brake calipers 26*a* and 26*b* can be remotely actuated through control conduit 28, causing the pulleys 16 and 17 to be clamped tightly and thereby preventing rotation of the pulleys 16 and 17. The friction of the multiple turns of the line 4 around the multiple grooves of the pulleys 16 and 17 prevents slippage of the line 4 relative to the clamped pulleys and thereby fixes the length of the line portion 4*a* between the pulley 16 and the attachment point 18*a* where the line 4 attaches to the second attachment element 18. Alternatively, sufficient turns around the pulley 16 alone could accomplish the same purpose, rendering pulley 17 unnecessary if desired.

The foregoing braking of the rotation of the second pulley 16 still permits rotation of the first pulley 8, as well as the guide pulley 24. Therefore, the operator can extend line 4 which increases the length of line portion 4*b* while the length of line portion 4*a* remains fixed as shown in FIG. 3, thereby tilting the container 6 downwardly to dump its material pivotally about the pivot points 20 and 22. Thereafter the operator can retract line 4 to bring the container 6 back to its level attitude as shown in FIG. 2, deactivate the brake 26 by relieving the pressure in the brake control conduit 28, and raise or lower the container 6 to a location for refilling.

It should be understood that other alternative types of line brakes 26 could be used herein. For example, a line-clamping brake could be used instead of a pulley-clamping brake, with the result that the clamped line would frictionally prevent rotation of the second pulley 16. Alternatively, the pulley 16 could itself have an internal brake which prevents rotation of the pulley.

The ability of the preferred second attachment element 18 to be moved in opposite directions toward and away from the first attachment element 10, coupled with the control of such movement by the pulley 24, advantageously keeps the center of gravity of the container always horizontally between the positions of the two line portions 4*a* and 4*b* both in the horizontal attitude and in the fully tilted attitude of the container 6, in a manner which optimizes control of the container's suspended horizontal attitude and maximizes the tilting angle which can be obtained to ensure complete dumping of the container's contents. Conversely, the preferred movability of the first attachment element 10 toward and away from the second attachment element 18 facilitates movement of the element 10 out of the way during filling of the container, while further optimizing the positions of the two line portions 4*a* and 4*b* both in the horizontal attitude and in the fully tilted attitude of the container 6. The attachment elements 10 and 18 also preferably move relative to each other so that they come into contact with each other in the horizontal attitude of the container 6 as shown in FIG. 2. However, these features represent preferred optimizations of the system rather than features necessary for operability, and may be altered if necessary or convenient.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A dumping system adapted for suspension from a support, said system comprising:

(a) a container capable of dumping material therefrom by selectively tilting said container, said container being vertically movable with respect to said support by a selectively extensible and retractable hoist line suspending said container from said support;

(b) a first pulley attached by a first attachment element to said container so that said hoist line can be wrapped under said first pulley to suspend said container;

(c) a second pulley attachable to said support so that said hoist line can be wrapped over said second pulley to extend from said first pulley to said second pulley;

(d) a second attachment element on said container to which said hoist line can be attached to extend from said second pulley to suspend said container; and (e) a selectively-actuated brake capable of selectively preventing rotation of said second pulley while permitting rotation of said first pulley, so that said container is tiltable to dump said material therefrom by moving extension of a portion of said hoist line from said support while said brake is actuated, without corresponding moving extension of a second portion of said hoist line from said second pulley.

2. The dumping system of claim 1 wherein said second attachment element is movably attached to said container so as to be movable in opposite directions toward and away from said first attachment element.

3. The dumping system of claim 1 wherein said second attachment element has a third pulley thereon under which a portion of said hoist line, extending from said first pulley to said second pulley, can be wrapped.

4. The dumping system of claim 1 wherein said second attachment element is a bail pivotally attached to said container at two opposed locations so as to be pivotal in opposite directions toward and away from said first attachment element.

5. The dumping system of claim 1 wherein said first attachment element is movably attached to said container so as to be movable in opposite directions toward and away from said second attachment element.

6. The dumping system of claim 1 wherein said first attachment element is a bail pivotally attached to said container at two opposed locations so as to be pivotal in opposite directions toward and away from said second attachment element.

7. A dumping system adapted for suspension from a support, said system comprising:

(a) a container capable of dumping material therefrom by selectively tilting said container, said container being vertically movable with respect to said support by a selectively extensible and retractable hoist line suspending said container from said support;

(b) a first pulley attached by a first attachment element to said container so that said hoist line can be wrapped under said first pulley to suspend said container;

(c) a second pulley attachable to said support so that said hoist line can be wrapped over said second pulley to extend from said first pulley to said second pulley;

(d) a second attachment element on said container to which said hoist line can be attached to extend from said second pulley to suspend said container; and (e) a selectively-actuated brake capable of preventing rotation of said second pulley while permitting rotation of said first pulley, so that said container is selectively tiltable to dump said material therefrom in response to selective moving extension of a portion of said hoist line from said support, without corresponding moving extension of a second portion of said hoist line, while said brake is actuated.

8. The dumping system of claim 7 wherein said second attachment element is movably attached to said container so as to be movable in opposite directions toward and away from said first attachment element.

9. The dumping system of claim 7 wherein said second attachment element has a third pulley thereon under which a portion of said hoist line, extending from said first pulley to said second pulley, can be wrapped.

10. The dumping system of claim 7 wherein said second attachment element is a bail pivotally attached to said container at two opposed locations so as to be pivotal in opposite directions toward and away from said first attachment element.

11. The dumping system of claim 7 wherein said first attachment element is movably attached to said container so as to be movable in opposite directions toward and away from said second attachment element.

12. The dumping system of claim 7 wherein said first attachment element is a bail pivotally attached to said container at two opposed locations so as to be pivotal in opposite directions toward and away from said second attachment element.

13. A dumping system adapted for suspension from a support, said system comprising:

(a) a container capable of dumping material therefrom by selectively tilting said container, said container being vertically movable with respect to said support by a selectively extensible and retractable hoist line suspending said container from said support;

(b) a first pulley attached by a first attachment element to said container so that said hoist line can be wrapped under said first pulley to suspend said container;

(c) a second pulley attachable to said support so that said hoist line can extend upwardly from said first pulley to be wrapped over said second pulley;

(d) a second attachment element on said container to which said hoist line can be attached to extend downwardly from said second pulley to suspend said container; and (e) a selectively-actuated brake capable of selectively preventing rotation of said second pulley while permitting rotation of said first pulley, so that said container is tiltable to dump said material therefrom by moving extension of a first portion of said hoist line from said support while said brake is actuated to prevent moving extension of a second portion of said hoist line from said second pulley.

14. The dumping system of claim 13 wherein said second attachment element is movably attached to said container so as to be movable in opposite directions toward and away from said first attachment element.

15. The dumping system of claim 13 wherein said second attachment element has a third pulley thereon under which a portion of said hoist line, extending from said first pulley to said second pulley, can be wrapped.

16. The dumping system of claim 13 wherein said second attachment element is a bail pivotally attached to said container at two opposed locations so as to be pivotal in opposite directions toward and away from said first attachment element.

17. The dumping system of claim 13 wherein said first attachment element is movably attached to said container so as to be movable in opposite directions toward and away from said second attachment element.

18. The dumping system of claim 13 wherein said first attachment element is a bail pivotally attached to said container at two opposed locations so as to be pivotal in opposite directions toward and away from said second attachment element.

* * * * *